United States Patent [19]

Marie et al.

[11] Patent Number: 5,799,031
[45] Date of Patent: Aug. 25, 1998

[54] DEVICE FOR FEEDING A GAS-MIXTURE LASER APPARATUS, AND LASER APPARATUS EQUIPPED WITH SUCH A DEVICE

[75] Inventors: Bruno Marie, Elancourt; Daniel Guerin, Chelles; Christian Larquet, Guyancourt; Antoine Willemot, Sceaux, all of France

[73] Assignee: L'Air Liquide, Societe Anonyme pour l'Etude et l'Exploitation des Procedes Georges Claude, Paris Cedex, France

[21] Appl. No.: 592,509

[22] Filed: Jan. 26, 1996

[30] Foreign Application Priority Data

Feb. 10, 1995 [FR] France ................... 95 01546

[51] Int. Cl.⁶ ............................... H01S 3/22; H01S 3/223
[52] U.S. Cl. ........................................ 372/59; 372/58
[58] Field of Search ............................ 372/58, 59

[56] References Cited

FOREIGN PATENT DOCUMENTS

| 0 575 206 | 12/1993 | European Pat. Off. |
| 3 084 980 | 4/1991 | Japan. |

*Primary Examiner*—Rodney B. Bovernick
*Assistant Examiner*—Robert E. Wise
*Attorney, Agent, or Firm*—Young & Thompson

[57] ABSTRACT

The gas mixture leaving the laser apparatus (1) is recycled to a permeator (45) which separates it into two flows. The discharge from the permeator is expanded in an expansion turbine (27) coupled to a compressor (35) for exerting suction on the recycled mixture, which makes it possible to obtain the desired reduced pressure in the laser apparatus. Applications to power laser apparatuses with nitrogen/carbon dioxide mixture, intended for cutting materials.

10 Claims, 3 Drawing Sheets

DEVICE FOR FEEDING A GAS-MIXTURE LASER APPARATUS, AND LASER APPARATUS EQUIPPED WITH SUCH A DEVICE

The present invention relates to a device for feeding a gas-mixture laser apparatus, of the type comprising a first duct used to convey a first gas to the apparatus, a second duct used to convey to the apparatus a second gas intended to be mixed with the first gas, a third duct used to recycle the mixture of the two gases leaving the apparatus, and a permeator, the inlet of which is connected to the third duct, the permeate outlet of which is connected to the second duct and the discharge outlet of which is connected to the first duct.

The pressures referred to below are absolute pressures.

FR-A-2,692,729 in the name of the Applicant Company describes a nitrogen and $CO_2$ feed device of the aforementioned type. This device is intended for a power laser apparatus for cutting materials, comprising a generator of an excited nitrogen flow, of the type with cold electrical discharge operating at a pressure of above $0.3 \times 10^5$ Pa and coupled to a waveguide having mirrors that are opposite relative to a main direction of the waveguide.

The term "cold electrical discharge" means the formation of excited species in a gas mixture, the temperature of the electrically neutral species in the gas mixture not exceeding 250° C., more generally 150° C. This type of discharge is also called, depending on the author, for example "corona discharge", "atmospheric pressure glow discharge", "barrier discharge" or else "silent discharge".

The optimum operating pressure of this laser apparatus, from the point of view of power and efficiency, is approximately 400 to 500 millibar.

The object of the invention is to feed the apparatus, recycle the gas mixture and separate it by permeation in a particularly economical fashion.

To this end, the subject of the invention is a feed device of the aforementioned type, characterized in that an expansion turbine is mounted in the first duct, in that a suction compressor is mounted in the third duct, and in that the mechanical energy developed by the turbine is used to drive the suction compressor.

The feed device according to the invention may include one or more of the following characteristics:
  the wheel of the turbine and that of the suction compressor are fixed on the same shaft;
  a second compressor, driven by an external energy source, is mounted in the third duct downstream of the suction compressor;
  the discharge outlet of the permeator is connected to the first duct via a second permeator, the inlet of which is connected to the discharge outlet of the first permeator, the discharge outlet of which is connected to the first duct and the permeate outlet of which is connected to the delivery of the suction compressor;
  the device comprises a heat exchanger which thermally connects the first duct, downstream (respectively upstream) of the turbine and the third duct, upstream (respectively downstream) of the suction compressor;
  the device comprises a heat exchanger which thermally connects the first duct upstream of the turbine, and the third duct, downstream of the suction compressor;
  the device comprises means for cooling the permeator or permeators;
  the turbine and the suction compressor are of the type having gas bearings;
  the first gas is at least essentially nitrogen and the second gas contains carbon dioxide.

A further subject of the invention is a gas-mixture laser apparatus equipped with a feed device as defined above.

Exemplary embodiments of the invention will now be described with reference to the appended drawings, in which.

In the following description, and in the drawings, identical or similar elements have the same reference numbers.

Figure 1:
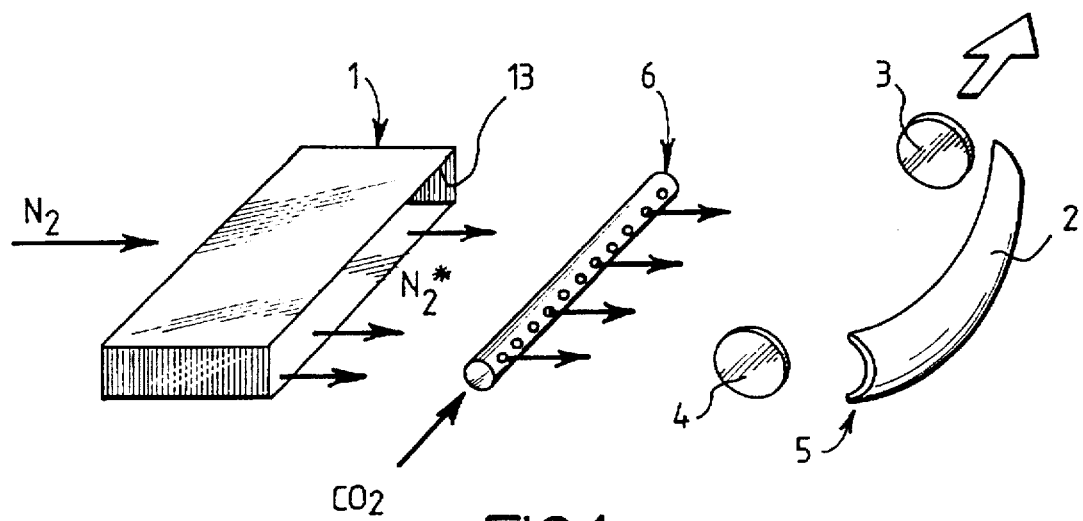
FIG. 1 is a schematic view illustrating the basic arrangement of an apparatus according to the invention.

The apparatus according to the invention, represented in FIG. 1, comprises a discharge generator 1 delivering at its outlet a gas flow comprising excited nitrogen molecules, delivered to a resonant cavity constituted by a waveguide, for example a "whispering gallery" section 2 in the shape of an arched gutter having a main radius of curvature greater than 1 m and provided at its opposite ends with a reflecting mirror 3 and with a mirror or window 4 for transmitting the laser beam.

The structure and the properties of a whispering gallery as a waveguide are described in document U.S. Pat. No. 4,194,808, Marhic et al. The use of such a whispering gallery as a laser is described in the article "Whispering gallery $CO_2$-laser" by Marhic et al., in IEEE Journal of Quantum Electronics, Vol. QE-15, No. 6 of June 1979. The mirrors 3 and 4 at the ends of the whispering gallery 2 consist of at least one C-II-A diamond plate, optionally coated, as described for example in FR-A-2,688,098 in the name of the Applicant Company.

As a variant, other types of waveguide can be used to replace the whispering gallery 2.

A $CO_2$ flow is mixed with the flow containing the excited nitrogen by an injection device 6 interposed between the resonant cavity 5 of the waveguide 2 and the outlet of the generator 1. The generator 1 is designed to produce, via an elongate outlet passage 13, a homogeneous gas flow transversely to the waveguide 2, which has a gutter shape having a main direction substantially parallel to the outlet passage 13.

Figure 2:
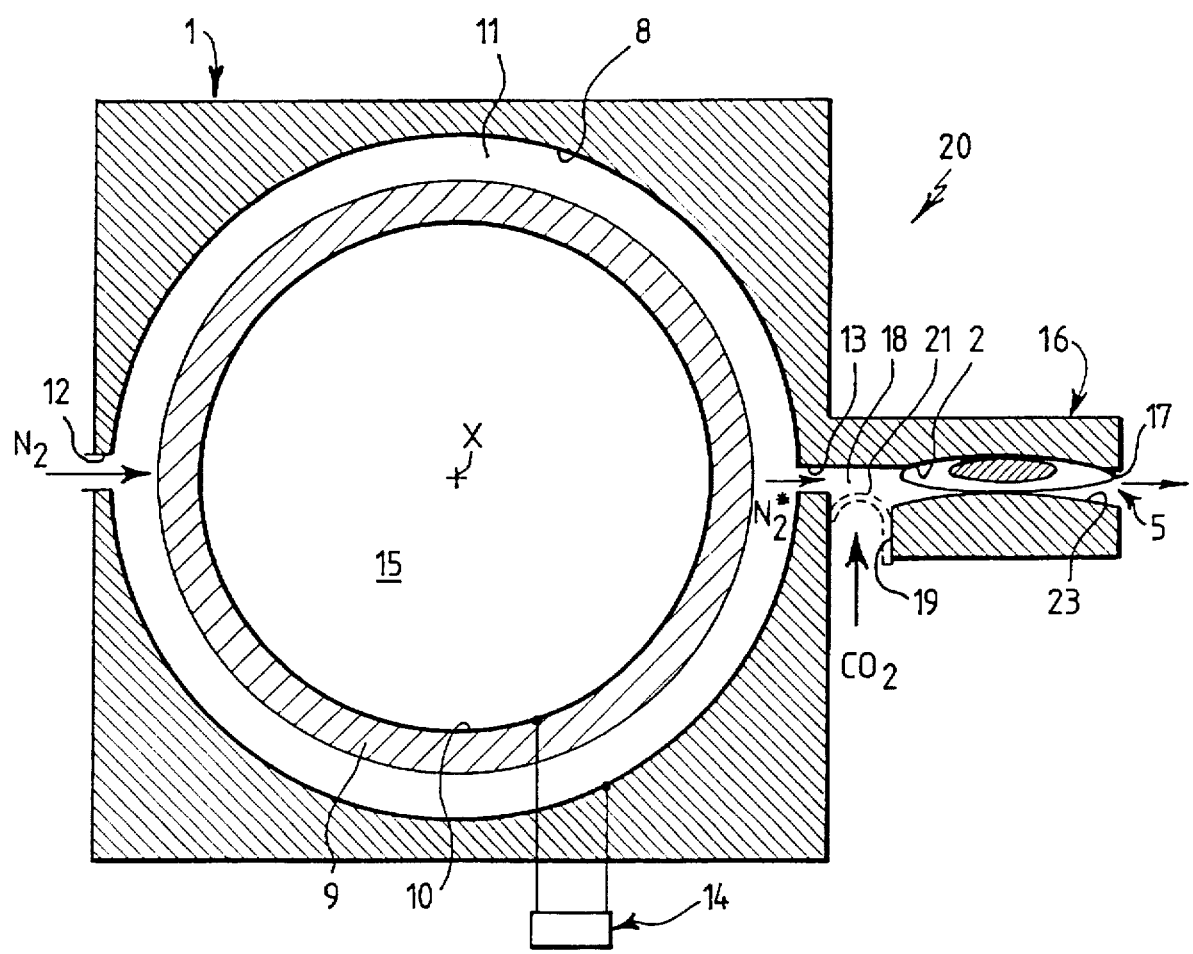
FIG. 2 is a schematic cross-sectional view of an apparatus according to the invention.

In the embodiment represented in FIG. 2, the generator 1 is as described in FR-A-2,692,730 in the name of the Applicant Company, and essentially comprises, in a metal block, a tubular peripheral electrode 8, of axis X, concentrically surrounding a coaxial dielectric tube 9, having an internal electrode 10 applied against its internal face and forming, with the peripheral electrode 8, a tubular gas passage 11, coaxial with the dielectric tube 9 and opening to the exterior of the block via an inlet 12 and an outlet 13 which are in the form of slots parallel to the axis X of the passage 11, are diametrically opposite and have a height not exceeding the radial thickness of the tubular passage 11. The electrodes 8 and 10 are connected to a high-voltage and high-frequency generator 14. The internal electrode 10 bounds an internal volume in which a coolant 15, for example water or a Freon, flows.

In the embodiment of FIG. 2, the apparatus is supplemented by a block 16 affixed to the generator block 1, defining a longitudinal housing which has a height of approximately 1 mm and in which the whispering gallery 2 is arranged with the bottom of the gutter substantially parallel to the diametral plane of the inlet and outlet 12 and 13, with a lateral gas outlet passage 17 and a parallelepipedal gas inlet passage 18 extending the outlet 13 of the block 1 and into which a parallelepipedal passage 19 opens transversely, this passage allowing $CO_2$ to be introduced into the inlet 18, for example via a homogenization grid 21 for mixing the $CO_2$ with the gas flow containing excited nitrogen, the latter transferring its energy to the $CO_2$ before introduction into the laser cavity, thereby exciting exclusively the upper level of the laser transition.

The laser beam schematically represented in FIG. 2 is elliptical and has a linear polarization. Since the gas enters through one side rich in vibrational energy and leaves depleted of this energy, the beam is asymmetric along the direction of the gas flow transversely to the gallery 2 (axis Z). In order to guarantee that a substantial portion of the excited species pass into the region containing the photons, the lower wall 23 of the housing of the gallery 2 may be provided with oriented indentations, thus promoting the formation of a highly turbulent flow in the housing.

Other details and some variants are described in the aforementioned FR-A-2,692,729.

Figure 3:
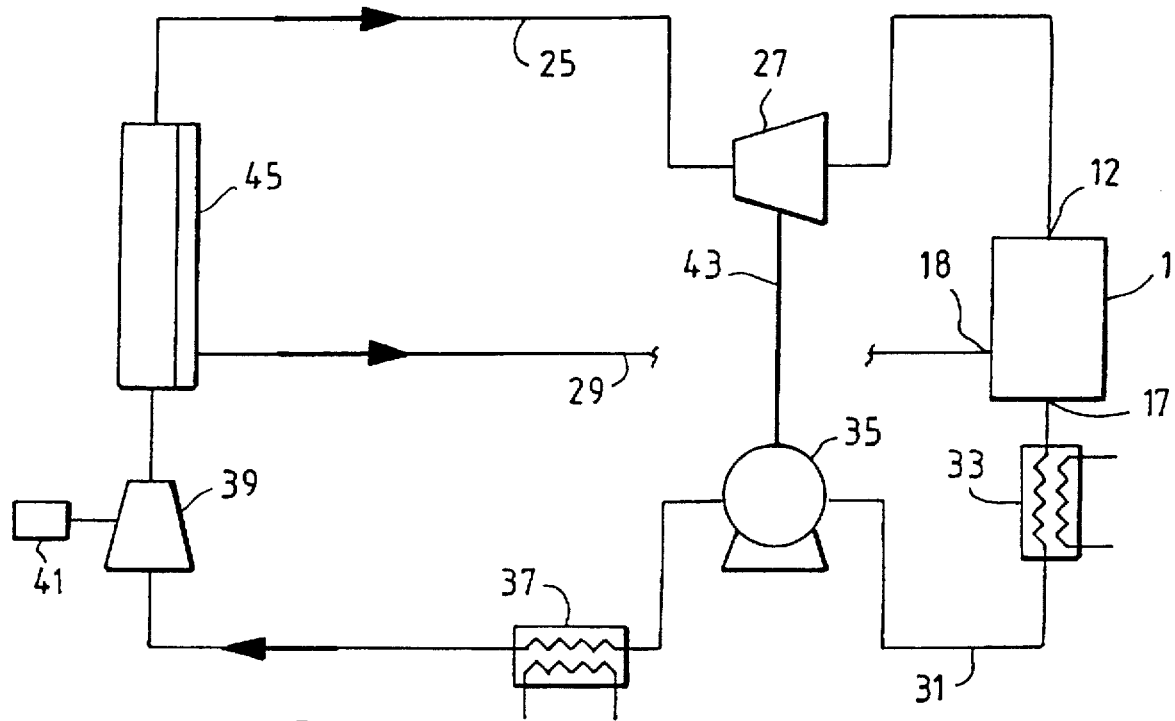
FIG. 3 is a schematically represented device according to the invention, intended for feeding gas to the apparatus in FIG. 2.

A description will now be given, with reference to FIG. 3, of the device for feeding the generator 1 with nitrogen and with $CO_2$.

This device comprises:

A first nitrogen feed duct 25 connected to the inlet 12 of the generator. An expansion turbine 27 is mounted in this duct.

A second $CO_2$ feed duct 29, connected to the inlet 18.

A third nitrogen/$CO_2$ mixture recycling duct 31 connected to the outlet 17. A water cooler 33, a suction compressor 35, a water cooler 37, and a compressor 39 driven by an electric motor 41 are successively mounted in this duct. The wheel of the compressor 35 and that of the turbine 27 are fixed on the same shaft 43.

A permeator 45, the inlet of which is connected to the delivery of the compressor 39, the discharge outlet of which is connected to the duct 25 and the permeate outlet of which is connected to the duct 29.

The operation of the device in FIG. 3 will now be described with a numerical example.

The total flow rate of a gas mixture containing 90% $N_2$ and 10% $CO_2$, flowing through the duct 31, is 240 Nm$^3$/h. The permeate flowing through the duct 29 represents 100 Nm$^3$/h and consists of virtually all of the $CO_2$, the rest being nitrogen. The discharge consists of almost pure nitrogen, with a flow rate of 140 Nm$^3$/h.

In order to operate the permeator, the mixture is compressed to 12 bar at 39, so that this pressure is that of the nitrogen discharged at 25. This nitrogen is expanded to 0.7 bar at 37. The permeate is delivered to the generator 1 at 1 bar via the duct 29.

The compressor 35 sucks in the mixture at 0.5 bar, which thus constitutes the pressure prevailing in the generator 1, and delivers it at 1 bar.

By virtue of the arrangement thus described, the available energy is recovered, by isentropic expansion, in the form of pressure at the discharge of the permeator 45, and it is used to provide the reduced pressure in the laser apparatus. In addition, the isentropic expansion strongly cools the nitrogen, which has the result of a substantial improvement, of the order of 10 to 15%, in the efficiency of the laser apparatus.

Devices of the gas bearing type, with very high rotational speeds, may advantageously be used for the turbine 27 and the compressor 35, thereby making it possible to save space.

In certain applications, the expansion of the nitrogen flow at 27 may be insufficient to compress the entire mixture flow at 35. It is then necessary to raise the delivery pressure of the compressor 39, which makes it possible to reduce the number of permeation modules but leads to an increase in the energy expenditure.

In order to reduce the supplementary energy needed at 35, measures may also be taken to reduce the ratio between the discharged nitrogen flow rate and the total flow rate to be compressed at 35. In fact, for a given rejected nitrogen flow rate, this reduces the said total flow rate.

In order to do this, a first method consists in reducing the temperature of the permeator 45. This actually produces an increase in the selectivity of the permeator, and therefore, for a given purity of the discharged nitrogen, an increase in the ratio between the nitrogen flow rate and the total flow rate. However, the number of permeation modules must be increased, because the permeability of the gases decreases as the temperature is lowered.

Figure 4:
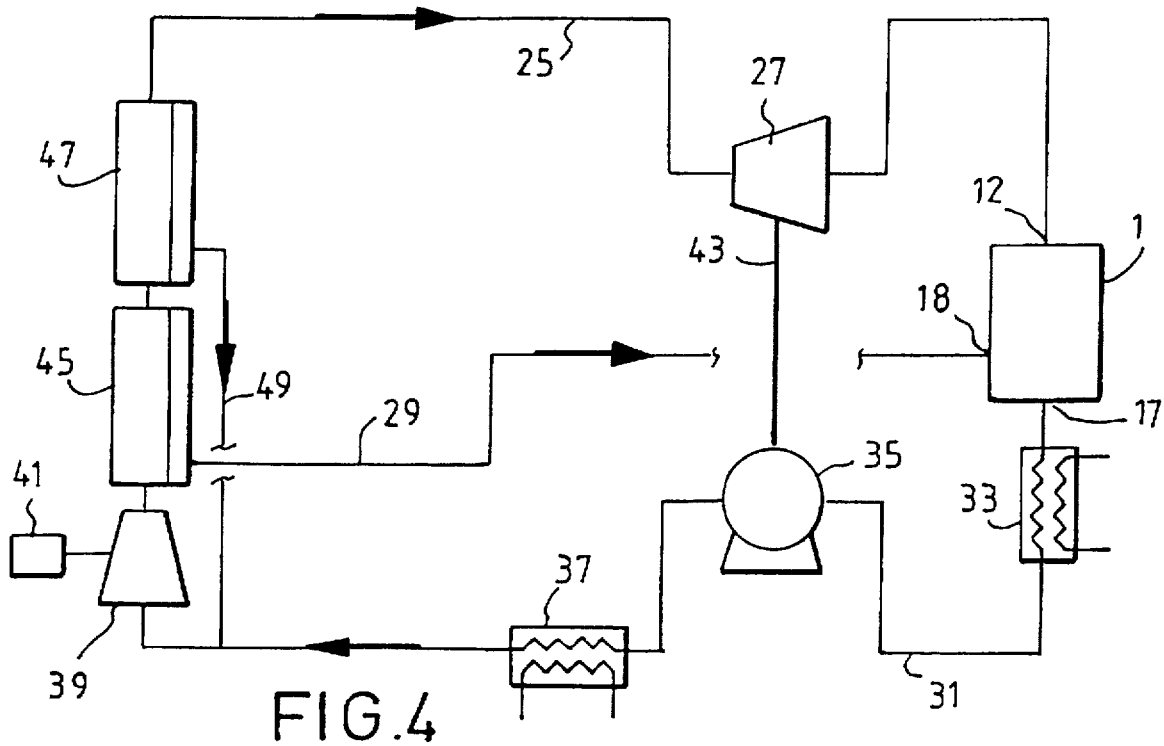
FIGS. 4 and 5 and 6 are similar views of three variants, respectively.

Another solution is illustrated in FIG. 4: a second permeator 47 is mounted downstream of the permeator 45, with its inlet connected to the discharge outlet of the latter, its discharge outlet connected to the duct 25, and its permeate outlet connected to the intake of the compressor 39 via a duct 49.

In this case, the permeator 45 recovers only a part of the $CO_2$, which is conveyed into the duct 29, whereas the permeator 47 purifies the nitrogen. In this way, the quantity of nitrogen conveyed by the duct 29 is greatly reduced, and the flow rate compressed at 35 is commensurately reduced.

Figure 5:
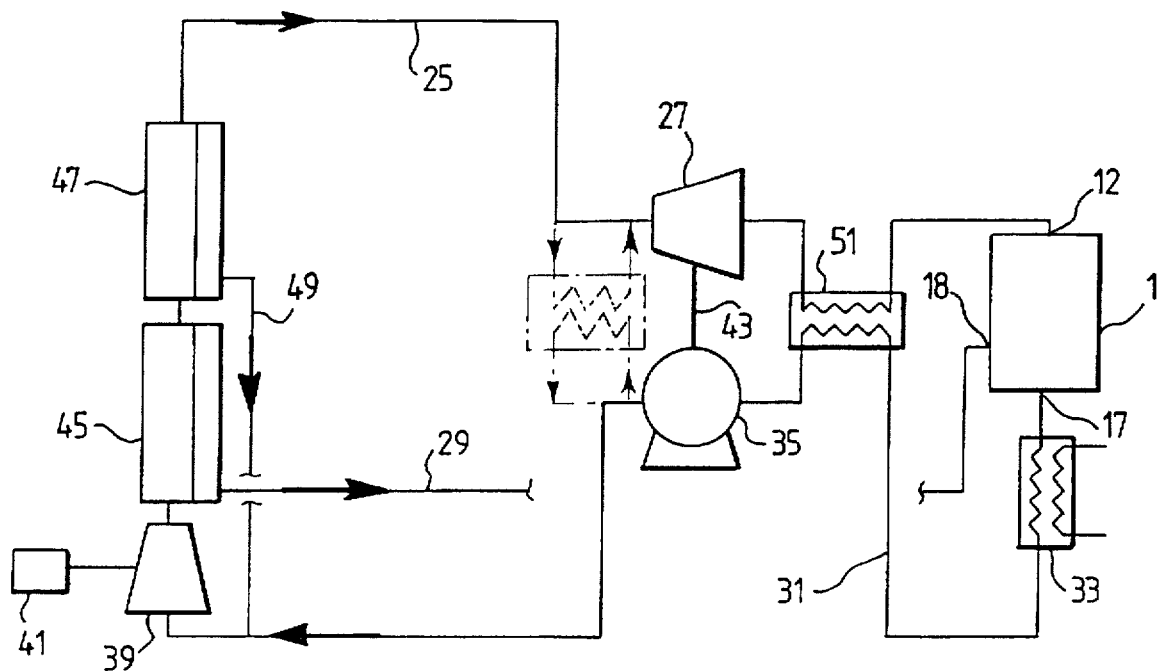

FIG. 5 represents a variant of the diagram in FIG. 4, in which the heat exchange 37 is omitted, whilst a heat exchange 51 thermally connects the cold nitrogen leaving the turbine 27 and the mixture sucked in by the compressor 35.

The latter therefore compresses a cooled gas mixture, which requires less energy.

As a variant, and as represented in broken lines, the exchanger 51 may thermally connect the nitrogen arriving at the turbine 27 and the mixture delivered by the compressor 35. The energy delivered by the expansion is then increased by increasing the temperature of the gas at the inlet of the turbine.

Figure 6:
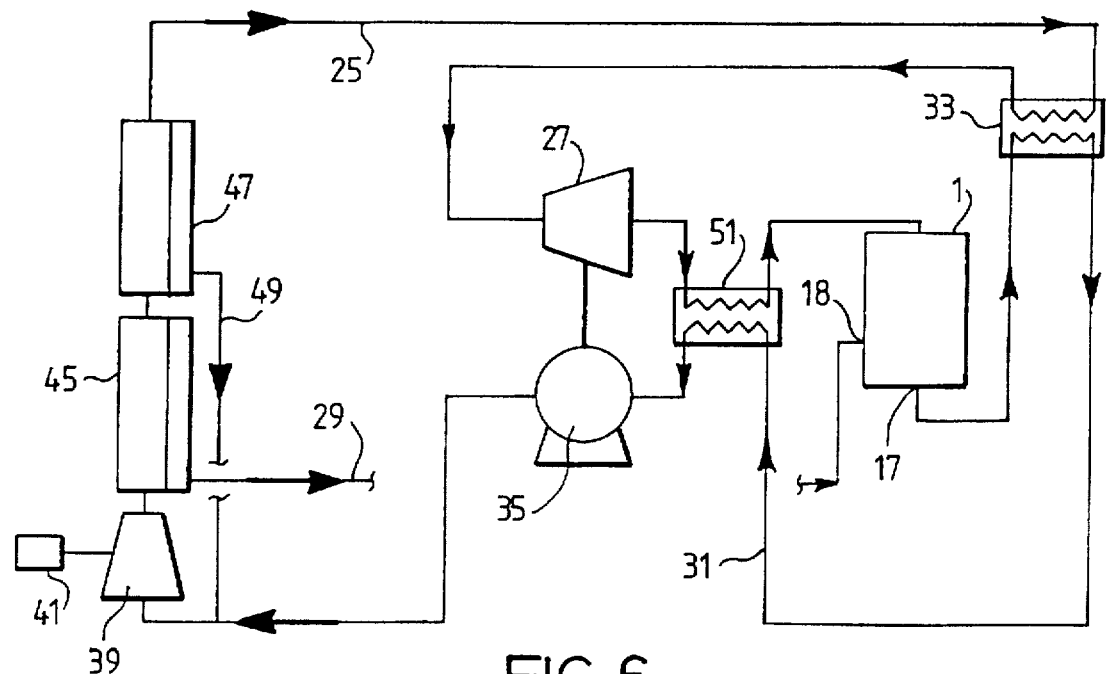

In the example of FIG. 6, the exchanger 33 used to cool the mixture leaving the generator 1 is cooled by the nitrogen leaving the permeator 47 and flowing to the turbine 27. Again, the gas feeding this turbine is thus heated, which increases the energy delivered by the expansion.

Of course, as described in the aforementioned FR-A-2, 692,729, a small quantity of hydrogen, typically of the order of 1%, may be added to the mixture. This hydrogen then permeates with the $CO_2$. Similarly, the nitrogen may contain a low percentage of oxygen.

We claim:

1. Device for feeding a gas-mixture laser apparatus, of the type comprising a first duct used to convey a first gas to the apparatus, a second duct used to convey to the apparatus a second gas intended to be mixed with the first gas, a third duct used to recycle the mixture of the two gases leaving the apparatus, and a permeator, the inlet of which is connected to the third duct, the permeate outlet of which is connected to the second duct and the discharge outlet of which is connected to the first duct, characterized in that an expansion turbine is mounted in the first duct, in that a suction compressor is mounted in the third duct, and in that the mechanical energy developed by the turbine is used to drive the suction compressor.

2. Device according to claim 1, characterized in that the wheel of the turbine and that of the suction compressor are fixed on the same shaft.

3. Device according to claim 1, characterized in that a second compressor, driven by an external energy source, is mounted in the third duct downstream of the suction compressor.

4. Device according to claim 1, characterized in that the discharge outlet of the permeator is connected to the first duct via a second permeator, the inlet of which is connected to the discharge outlet of the first permeator, the discharge outlet of which is connected to the first duct and the permeate outlet of which is connected to the delivery of the suction compressor.

5. Device according to claim 1, characterized in that it comprises a heat exchanger which thermally connects the first duct, downstream (respectively upstream) of the turbine and the third duct, upstream (respectively downstream) of the suction compressor.

6. Device according to claim 1, characterized in, that it comprises a heat exchanger which thermally connects the first duct upstream of the turbine, and the third duct, downstream of the suction compressor.

7. Device according to claim 1, characterized in that it comprises means for cooling the permeator or permeators.

8. Device according to claim 1, characterized in that the turbine and the suction compressor are of the type having gas bearings.

9. Device according to claim 1, characterized in that the first gas is at least essentially nitrogen and in that the second gas contains carbon dioxide.

10. Gas-mixture laser apparatus equipped with a feed device according to claim 1.

* * * * *